United States Patent [19]

Miller et al.

[11] Patent Number: 5,277,704
[45] Date of Patent: Jan. 11, 1994

[54] MIST COLLECTOR

[75] Inventors: David W. Miller, Cincinnati, Ohio; Timothy R. Kidd, Union; Steven D. Hoffman, Cold Spring, both of Ky.

[73] Assignee: Airecon Manufacturing Corp., Cincinnati, Ohio

[21] Appl. No.: 934,000

[22] Filed: Aug. 21, 1992

[51] Int. Cl.$^5$ ............................................. B01D 29/17
[52] U.S. Cl. ........................................ 55/321; 55/334; 55/341.2; 55/378; 55/422; 55/481; 55/DIG. 12
[58] Field of Search ................ 55/320, 321, 327, 334, 55/335, 341.1, 341.2, 350, 378, 483, 484, 497, 500, 493, 481, 422, DIG.12

[56] References Cited

U.S. PATENT DOCUMENTS

| | | | |
|---|---|---|---|
| 3,093,401 | 6/1963 | Hagendoorn | 55/483 |
| 3,208,205 | 9/1965 | Harms et al. | 55/500 |
| 3,733,790 | 5/1973 | Pierce | 55/334 |
| 4,323,376 | 4/1982 | Rosenquest | 55/DIG. 12 |
| 4,435,197 | 3/1984 | Nijhawan et al. | 55/480 |
| 4,946,483 | 8/1990 | Coral | 55/334 |

FOREIGN PATENT DOCUMENTS

| | | | |
|---|---|---|---|
| 0643656 | 4/1937 | Fed. Rep. of Germany | 55/422 |
| 2724590 | 12/1978 | Fed. Rep. of Germany | 55/422 |
| 2088245 | 6/1982 | United Kingdom | 55/378 |

OTHER PUBLICATIONS

American Air Filter, Jun. 1984, Dynapure Mist Collector Model A-1.
Royal Products, Dec. 3, 1990, Royal Filtermist.
American Air Filter, Mar. 1984, American Air Filter Solutions To Oil Mist Problems.
American Air filter, Aug. 1985, Dynapure Oil Mist Collector.
American Air Filter, Oct. 1987, AAF Oil-Pak Collector.
AireCon Manufacturing Corp., AireCon Mist Collectors.

*Primary Examiner*—Robert H. Spitzer
*Attorney, Agent, or Firm*—Wood, Herron & Evans

[57] ABSTRACT

A mist collector for separating liquid components from a mist-laden gas stream to include a housing which houses three filter or separation stages. The stream is pumped through ducts into the bottom of the housing, and is pulled upwardly through the filter stages. The third filter stage comprises a commercially available filter assembly with a plurality of filter envelopes having bottom open ends secured across a midposition of the housing and upper closed ends supported adjacent the top of the housing. A doorway provides access to the inside of the housing. The upper closed ends of the envelopes are supported by hanger rods which connect to horizontally movable slides which slide within horizontal channels mounted to the internal side walls of the housing. The slides extend partially out through the doorway to enable the assembly to be connected to and disconnected from the collector outside of the housing.

8 Claims, 3 Drawing Sheets

MIST COLLECTOR

FIELD OF THE INVENTION

This invention relates to a mist collector, and more particularly, this invention relates to an improved support structure for holding a filter assembly in a mist collector.

BACKGROUND OF THE INVENTION

In many processing applications, air or gas is laden with a mist comprising an overspray or an excess from a processing operation. This may occur in machining operations using coolants and lubricants, in fluid treating of compounds and mixtures, and in many other diverse applications. Accordingly, this invention is useful in many applications but for purposes of clarity will be described herein connection with its use in machining operations.

During machining operations on a workpiece, it is common to bathe the point of contact between the workpiece and the bit, tool or blade of a machine tool with a liquid stream to lubricate and reduce heat buildup. For economic and environmental reasons, this liquid coolant is usually recycled. While most of the liquid coolant splashes off of the workpiece and is collected in a trough located below, some of the coolant breaks down into small droplets and becomes airborne. Mist collectors have been used to remove these airborne liquid droplets from the immediate vicinity of the machine tool and separate the liquid component from the gaseous component. Mist collectors vary in size and capacity.

One form of conventional mist collector stands alone, away from the machine tool, with duct work conveying a mist-laden gas or air stream from the vicinity of the machine tool to a housing of the collector. After the mist-laden gas stream enters the collector housing, the liquid droplets are filtered from the gas stream, and both the filtered liquid and the clean gas stream exit from the housing through separate outlets. A blower or fan located in the system pulls the mist-laden stream into the housing and through one or more filter stages located inside the housing.

In one form of known collector, the mist-laden gas stream enters the collector housing adjacent the bottom, through a perforated member. This member serves as a first stage or droplet coalescing section. A downwardly sloped surface is located adjacent and below the opening. Some of these larger droplets impinge on the perforated member and eventually fall to the sloped surface and flow into a gutter which feeds the fluid outlet. Smaller droplets or even liquid components of the gaseous vapor also coalesce together as they go through the perforated member to form larger droplets which drop out or are easier to remove from the gas stream.

The rest of the mist-gas stream flows upwardly through a port covered by a metal mesh filter. This filter spans a cross-sectional area of the housing and serves as a second stage filter for the mist laden stream. Mist and/or droplets which contact this screen eventually fall downward to the bottom angled surface.

Finally, a third filter stage located above the second filter stage includes a plurality of cloth envelopes or bags and the fluid stream passes therethrough. The cloth envelopes are arranged side by side and cover the entire cross-sectional area of the housing. Bottom open ends of the envelopes connect to a bottom support rack or frame which rests upon a ledge formed around the inside surface of the housing. Upper closed ends of the cloth filter envelopes are held by an upper rack located adjacent the top of the housing. For conventional filter envelopes, a rod extends through the top end of each envelope and opposite ends of the rods removably connect to fixed brackets mounted on opposite sidewalls of the inside of the collector housing. A commercially available envelope assembly generally includes the bottom rectangular frame with the open ends of the envelopes already secured thereto.

To maximize the efficiency and the useful life of a mist collector, the screen and mesh filters require occasional cleaning, and the cloth filters must be replaced. A door connected to the front of the housing provides access into the housing for removal, cleaning and/or replacement of these components. The first and second stage filters are rather difficult to remove, as well as the cloth filter envelopes forming the third filter stage. Typically, in this prior unit, the cloth filter bags occupy a volume which is at least two feet high, about 2½ feet wide and about two feet deep.

To reach all of the hanger rods for disconnecting the upper ends of the envelopes or the filter bags, particularly the hanger rods connected in the rear of the housing, an operator must extend his or her arms into the back of the housing to grab each of the hanger rods at the locations of the fixed brackets. It is sometimes difficult for the operator to see exactly where the rods are connected, due to little or no lighting in the rear of the housing. Invariably, the envelopes from the front end are disconnected and extended forwardly, between the operator and the housing, the operator must lean forward and come into contact with the used envelopes. Because the filter envelopes become wet and dirty after a period of use, the operator usually gets wet and dirty from contacting the envelopes. In short, removal and replacement of these filter bags is a dirty, difficult and time-consuming process.

It is thus one objective of this invention to facilitate efficient removal and replacement of filter envelopes in a mist collector.

To these ends, a preferred embodiment of the invention includes a structure wherein the upper hanger rods of the cloth filter envelopes are mounted to horizontally movable slides on opposite side walls of the housing. The entire filter assembly may be drawn into and out of the housing with the top ends sliding and the bottom frame being moved laterally into and out of the housing by hand.

With the filter assembly extended partially outside of the housing, the hanger rods of the used filter envelopes are easily reachable for removal from the rack, and the hanger rods of replacement filter envelopes may be easily connected. Thereafter, the filter assembly may be slid horizontally back into the housing and the door closed. This invention makes the removal and replacement of a filter assembly a clean and simple process.

In addition, the invention further contemplates a simple and effective clamping mechanism for securing the bottom rectangular frame of the filter assembly to an internal ledge in the housing.

According to a preferred embodiment of the invention and while various numbers of droplet separation or filter stages can be used, a preferred mist collector includes a housing with a door which defines an opening therein for access to the filter components for three droplet separation filter stages. Inside the housing, adjacent the top, a pair of channels are mounted to opposite sidewalls. Each channel slidably supports a slide member, and each slide may be horizontally extended outwardly through the door opening. The slides include spaced depression or indentations for supporting opposite ends of the hanger rods which extend through the upper closed ends of the filter envelopes. Because the slides may be moved horizontally through the opening of the housing, the filter envelopes may be conveniently connected or disconnected outside of the housing without requiring that an operator reach into the back of the housing. By replacing the prior, conventional fixed brackets used to hold the hanger rods inside the housing and utilizing slidable members for holding the rods, this invention facilitates access for an operator to all of the hanger rods used to support the upper ends of the filter envelopes of a filter assembly.

At the lower end of the filter assembly, open ends of the bags or envelopes are held in place by a bottom rectangular frame. This frame is horizontally moveable into place on an internal ledge formed around the inside of the housing. On each side of the housing, adjacent the ledge, a pair of spaced hinged clamps are operable to removeably secure the rectangular frame to the ledge. On each side, the clamps are rigidly connected to a horizontal rod which is rotatably secured adjacent the ledge. Rotation of the rods operates the clamps. Adjacent the door, at the forward end of the housing, a handle end of each rod extends inwardly at a 90° angle. By grasping the handle ends and moving the handles through a vertical plane parallel with the front of the housing, the rods rotate about a horizontal axis, thereby rotating the clamps into contact with the bottom rectangular frame of the bag assembly. Preferably, a pair of retainers are mounted to the ledge adjacent the door. Each retainer holds a handle in its downward position to clamp the frame in place within the housing.

Overall, the filter rack of this invention facilitates installation and removal of a filter assembly, thereby minimizing down time for the mist collector and improving work conditions for the operator.

These and other features of the invention will be more readily understood in view of the following detailed description and the drawings.

BRIEF DESCRIPTION OF THE DRAWINGS

FIG. 5 is a fragmentary perspective view, similar to FIG. 1, showing insertion of the hanger rods in the tops of the filter bags in accordance with a preferred embodiment of the invention; and FIG. 6 is a fragmentary perspective view, similar to FIGS. 1 and 5, showing placement of the bottom rectangular frame within the mist collector after the hanger rods have been connected.

DETAILED DESCRIPTION OF A PREFERRED EMBODIMENT

Figure 1:
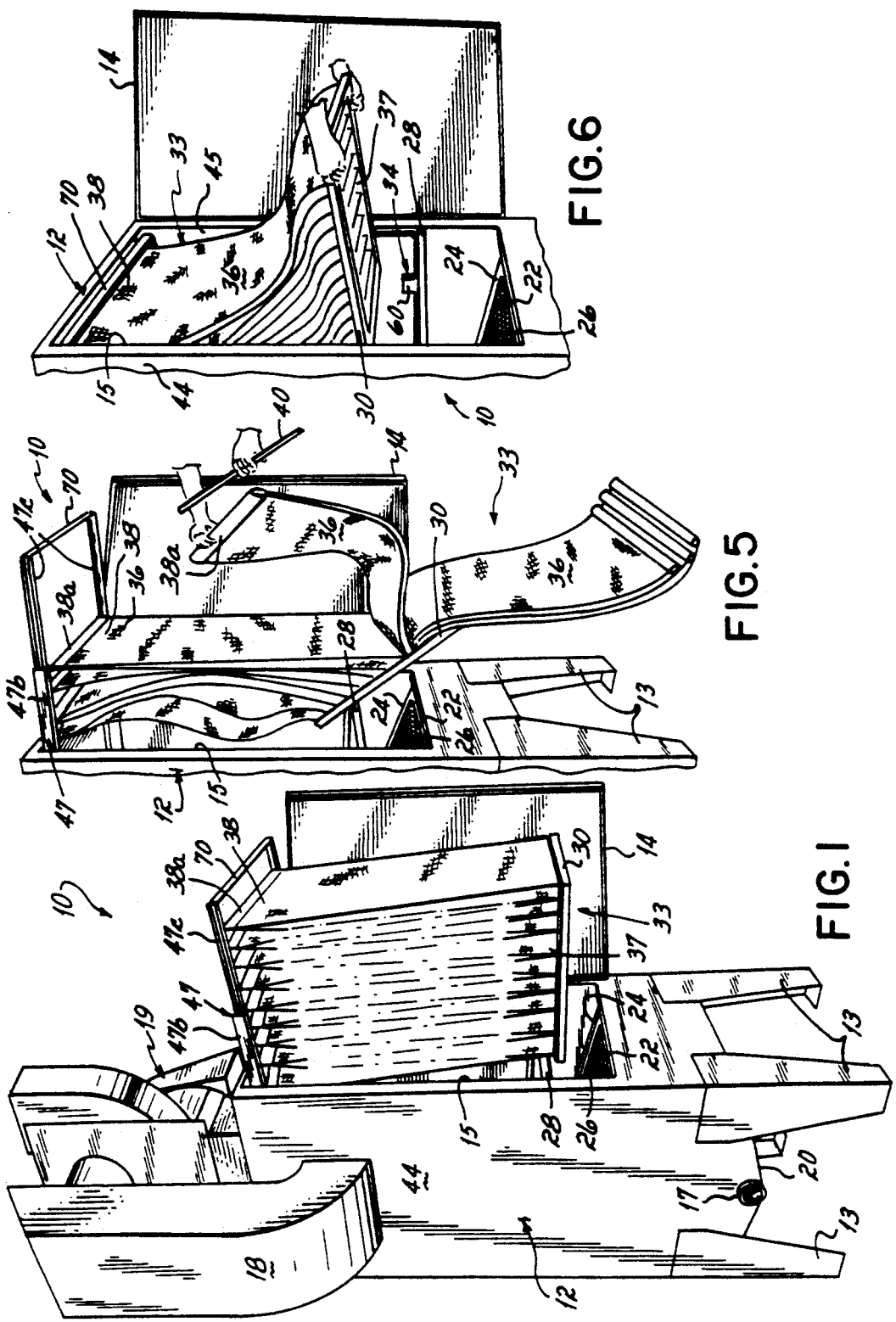
FIG. 1 is a perspective view of a mist collector in accordance with a preferred embodiment of the invention housing the filter envelope assembly outside the collector housing.
Figure 2:
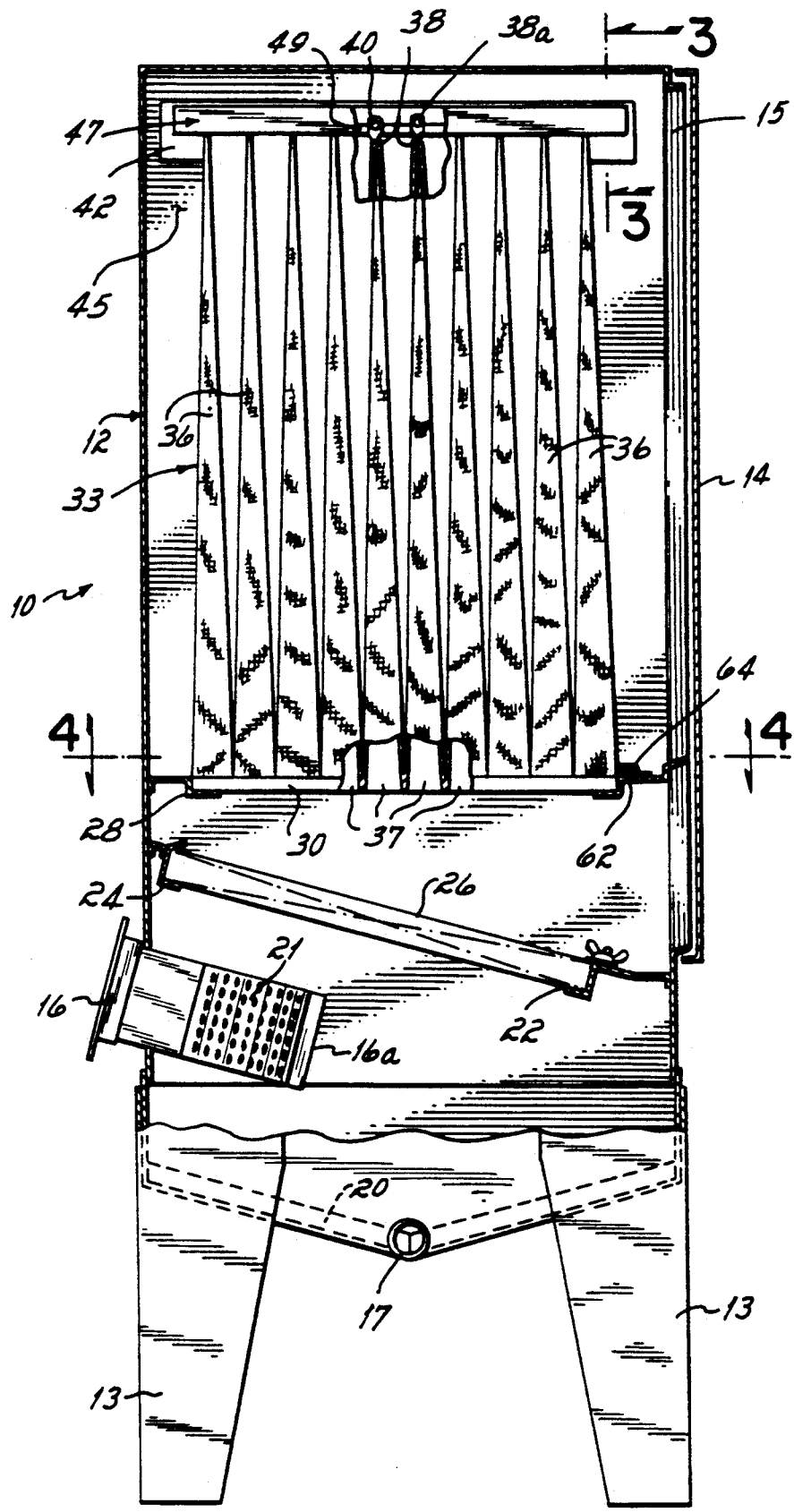
FIG. 2 is a cross-sectional side view of the mist collector depicted in FIG. 1 and showing the three filter stages, the filter envelope assembly being inside the collector with the door closed.

FIG. 1 shows a mist collector 10 in accordance with a preferred embodiment of the invention. The mist collector 10 includes a housing 12 supported on legs 13. A door 14 provides access to the inside of the housing 12 via a door opening 15. As seen in FIG. 2, an inlet duct 16 connects to the rear surface of the housing 12 adjacent the bottom. The inlet duct 16 conveys a coolant-laden stream to the housing 12. Such stream in this embodiment comprises for example, droplets of coolant carried in a gaseous stream of air. The stream is filtered in the housing 12 to separate liquid from gaseous components. The separated liquid flows out of the housing 12 via an outlet drain 17 (FIG. 1) while the filtered portion of the stream flows out of the housing 12 via a clean air outlet duct 18.

A fan or blower 19 is located atop housing 12 and is operably connected to the clean air outlet duct 18 to pull the gas stream into and through the housing 12. Alternately, depending upon the capacity of the collector 10 and the size of the fan 19, the fan 19 may be located alongside the housing 12. If desired, a plurality of these mist collectors 10 may be connected serially or in parallel relationship and operated simultaneously by a large fan or blower.

As shown in FIG. 2, the inlet duct 16 has an inner end 16a which is sloped downwardly at an angle of about 15°. A bottom inside surface 20 of the housing 12 is also sloped. The inner end 16a of duct 16 constitutes a perforated member 21 which functions as a first stage droplet separator, and also to coalesce smaller drops moving in the gas stream into larger drops. Alternately, a separate perforated member could be placed on the duct end. Fluid droplets contacting the screen 21 eventually fall to the surface 20 and run down to a sump which feeds into outlet drain 17. Fluid which passes through perforated member 21 moves upwardly through the housing 12, under the force of the fan 19.

As seen in FIG. 2, the housing 12 includes an inside ledge 24 above inlet port 22 adapted to receive a rectangularly shaped mesh filter 26. Preferably, the ledge 24 and the filter 26 are sloped downwardly and forwardly within the housing 12. This mesh filter 26 serves as a second stage droplet separation or filter for the mist collector 10.

Figures 4, 4A:
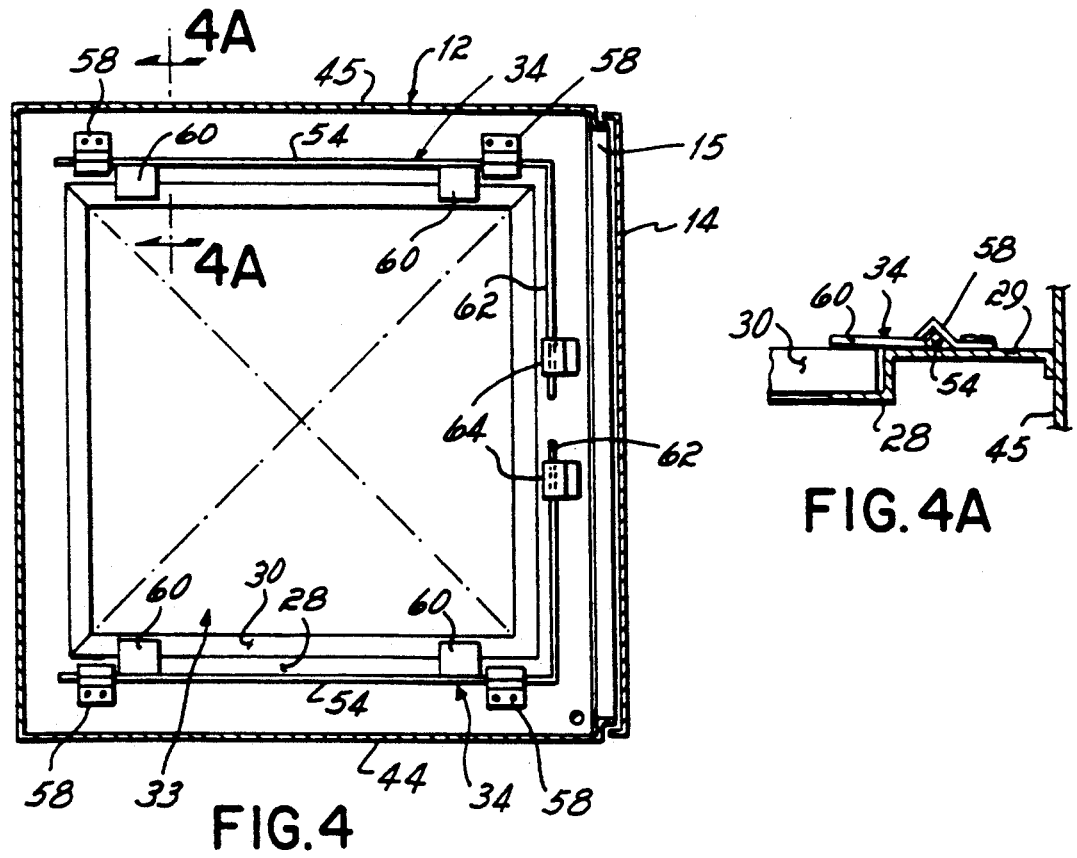
FIG. 4 is a cross-sectional view along lines 4—4 of FIG. 2 which shows the details of the clamping mechanism for securing the bottom frame of the filter envelope assembly.
FIG. 4A is a cross-sectional view taken along lines 4A—4A of FIG. 4.

With reference to FIGS. 2, 4 and 4A, it can been seen that above mesh filter 26, the collector 10 includes a horizontal ledge 28 which extends around the four sides of the inside perimeter of the housing 12 and depends from a similarly four-sided partition 29. External to the mesh filter 26, this partition 29 forms a boundary between the upstream unfiltered and the downstream filtered sections of the housing 12. During operation of the mist collector 10, the ledge 28 supports a bottom rectangular frame 30 of a filter assembly, designed generally by reference numeral 33. On opposite sides of the housing 12, the ledge 28 includes a clamping mechanism 34 for holding down the bottom frame 30. The filter assembly 33 includes the bottom frame 30 and a plurality of filter bags or envelopes 36. The bags 36 are arranged such that their open bottom upstream ends 37 are secured to the frame 30, while the closed upper downstream ends 38 are supported thereabove. The tops 38 of the bags 36 include sleeves 38a, each of which is adapted to receive therethrough a hanging rod 40. Loops or other devices could be used. The rods 40 may or may not come with the rest of the filter bag or envelope assembly 33. In developing this invention, applicant has used filter bag assemblies 3 manufactured by Airguard Industries of Louisville, Kentucky, Model Nos. 0665036, 0665104, 0665103 and 0665102.

Figures 3, 3A:
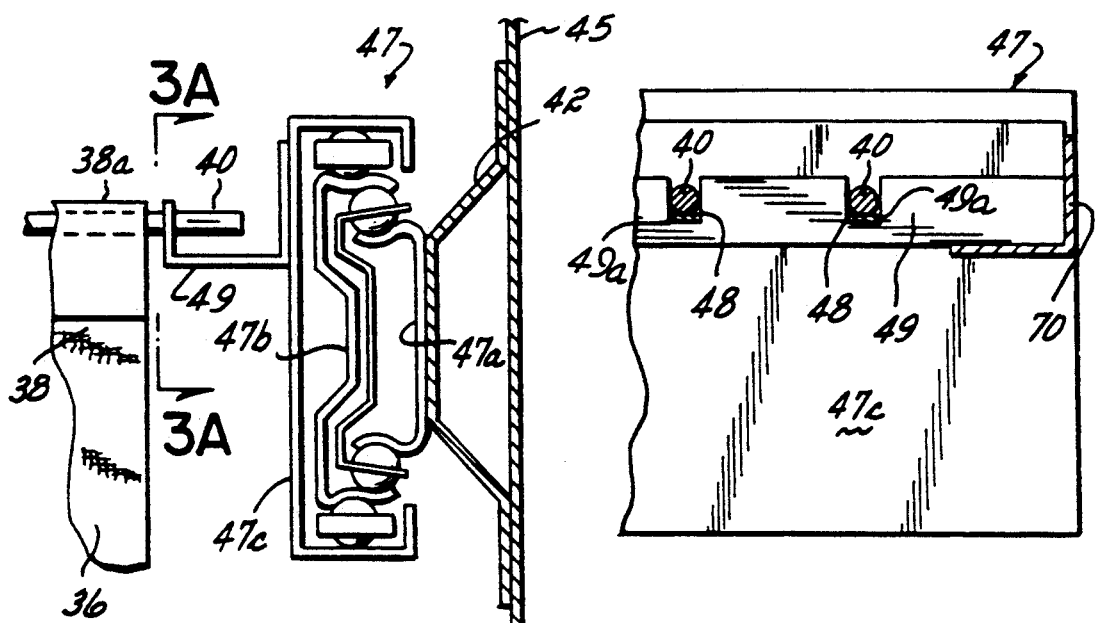
FIG. 3 is an enlarged, cross-sectional view taken along lines 3—3 of FIG. 2 showing the details of the channel/slide structure for horizontally sliding the filter bag assembly out of the housing.
FIG. 3A is a cross-sectional view taken along lines 3A—3A of FIG. 3.

Adjacent the top of the housing 12, a pair of channels 42 are secured to the inside surfaces of the side walls 44 and 45 of the housing 12. FIG. 3 illustrates one side wall 45 of the housing 12, the other being essentially a mirror image of FIG. 3. Both of the channels 42 are located at the same vertical height. A pair of slides 47 are slidably mounted to the channels 42. In the illustrative embodiment, one member 47a is fixed to channel 42, an intermediate member 47b is slidably mounted to member 47a, and a third member 47c is slidably secured to member 47b. The structural arrangement of the slides 47 with respect to the channels 42 is similar to the commercially available slide mechanism used for drawers. In developing the invention, applicant has used drawer slides manufactured by Grant or Hettich, and identified by Part Nos. 555-26 and 555-24. The structure shown in FIG. 3 is for exemplary illustration only. The ends of the hanger rods 40 are connectably supported to the horizontal slides 47 by indentations 48 (FIG. 3A) in a channel 49 to member 47c. This mounting means secures the upper ends 38 of the bags 36.

Preferably, the top of each of the channels 49 has a spaced plurality of the indentations 48. Each indentation 48 is aligned with a corresponding indentation (not shown) which is similarly fixed to the opposite wall 44 by a slide 47. The indentations 48 are sized to receive the hanger rods 40. Additionally or alternatively, each magnetic material include deposited or inlaid magnetic material adjacent the indentations to magnetically hold the rods 40 in the proper spacing as shown by reference numeral 49a.

Because the slides 47 move laterally through the open door 14 (FIG. 1) of the housing 12, the tops 38 of the bags or envelopes 36 may be easily and conveniently connected to and disconnected from the collector 10 outside the housing 12. By extending the mounted filter assembly 33 at least partially outside the door opening 15, this invention eliminates the need to reach through the door opening 15 to fixed locations within the housing 12 in order to connect and disconnect the support rods 40 for the filter assembly 33.

In combination with the simple and easy clamping mechanism 34 used to hold the bottom frame 30 to the housing 12, the opposed channels 49 and slides 47 simplify the installation, removal and replacement of a filter bag assembly 33 from a mist collector 10. As shown most clearly in FIGS. 4 and 4A, each clamping mechanism 34 includes a horizontal rod 54 rotatably secured in place within a pair of spaced guide brackets 58. A pair of spaced, right angle clamps 60 are rigidly connected to each rod 54. Rotation of the rod 54 rotates the clamps 60 into and out of engagement with the frame 30 when the frame 30 is supported on the ledge 28. The forward end of each of the rods 54 comprises a handle 62 oriented at a 90° angle to rod 54. Movement of the handle 62 through a vertical plane parallel with the door 14 rotates the rod 54 within the guides 58, thereby rotating the clamps 60.

A forward section of the ledge 28 includes a pair of spaced handle retainers 64. Preferably, each retainer 64 is an angled clip sized to hold a respective handle 62 to secure the clamp mechanism 34 in a downward clamping position against the frame 30.

In use, when it is time to remove and replace used filter assembly 33, the door 14 is opened to provide access into the housing 12 via doorway 15. An operator may then grasp a transverse support member 70 (FIG. 5) which connects forward ends of the slide member 47c and pulls the member to slide the slides 47 with respect to the channels 42 outwardly through the opening 15. With the forward bags 36 extended through the doorway 15 and outside of the housing 12, an operator may lift the corresponding hanger rods 40 from within the indentations 48 and then slidably remove the rods 40 from the sleeves 38a at the top ends 38 of the bags 36. With the first few bags 36 disconnected, the operator may then slide the assembly 33 further outwardly through the doorway 15. The hanger rods 40 for the next bags 36 may be removed from the slides 47 and the bag 36 in a similar manner. Eventually, to remove the last of the hanger rods 40, the operator will have to lift the bottom frame 3 from the ledge 28 and extend it partially outwardly through the doorway 15. With the used filter assembly 33 disconnected from the collector 10, a new replacement assembly 33 may be readily connected.

FIG. 5 shows the hanger rods 40 as they are being extended through the sleeves 38a at the top closed ends 38 of the bags 36. This is the initial step required for locating the assembly 33 within the housing 12. All of the hanger rods 40 may be inserted at the same time, or the hanger rods 40 may be extended through the sleeves 38a one at a time, with each bag 36 then being connected to the slides 47. To connect the inserted hanger rods 40 at the top ends 38 of the bags 36 to the slides 47, the bottom frame 30 of the filter bag assembly 33 should be resting on the forward section of ledge 28 for support. Starting with the hanger rods 40 which correspond to the bags 36 which will be located in the back of the housing 12, the operator begins locating the rods within the spaced indentations 48 in the channels 49 of the slides 47. As the hanger rods 40 corresponding to the middle and forward portions of the assembly 33 are connected to the slides 47, frame 30 will also need to be moved toward the rear of the housing 12. Eventually, the frame may be moved entirely within the housing 12 and supported on all four sides of ledge 28. With all of the hanger rods 40 connected to the slides 47, and the slides slid horizontally all the way within the housing 12, the handles 62 may be moved downwardly and placed inside the retainers 64 to rotate the clamps 60 into engagement with the bottom frame 30. Thereafter, the door 14 is closed and the mist collector 10 may be put back into use.

Accordingly, the invention greatly facilitates replacement of filters in mist collectors. It will be appreciated, of course, that the filter assembly may take the form of filter envelopes as described, filter bags, cylindrical tubes or other forms of flexible filter means which generally are not self-supporting and which may be removed for cleaning or replacment. The term "filter envleopes" is thus used broadly herein. Moreover, filter envelopes could be mounted in removeable cassettes, carriers or frames which are replaceable as a unit.

These and other modifications and advantages will be readily appreciated by those of ordinary skill in the art without departing from the scope of the invention, and applicant intends to be bound only by the claims appended hereto.

We claim:

1. In a mist collector wherein a mist-laden gas stream is directed into a housing and through a multipocket filter assembly to separate liquid components from the gas stream as the gas stream moves upwardly through the housing, the filter assembly including a plurality of filter envelopes scanning a gas stream flow path, the filter envelopes having first upstream open ends and second downstream closed ends, with the open ends located below the closed ends, and the housing having a doorway, the improvement comprising:

first means for securing the filter assembly to the housing on the inside thereof at the first open ends of the filter envelopes, said first means located inside the housing; and second means for moveably mounting the closed ends of the filter envelopes to the housing on the inside thereof, said second means being slidable through the doorway to a position at least partially outside of the housing, thereby to facilitate connecting and disconnecting of the filter assembly at the closed ends of the filter envelopes, outside the housing.

2. The mist collector of claim 1 wherein said second means further comprises:

a pair of channels mounted inside the housing to opposite sidewalls thereof, the channels located at the same vertical height adjacent an upper end of the housing;

a pair of slides, each slide being slidably connected to a channel so as to be horizontally movable through the doorway a predetermined distance; and means for removably connecting the closed ends of the filter envelopes to the slides, thereby permitting the filter envelopes to be connected to and disconnected from the mist collector while partially outside of the housing.

3. The mist collector of claim 2 wherein the connecting means further comprises:

a plurality of hanger rods, each rod supporting a downstream closed end of one filter envelope; and a plurality of depressions spaced equidistantly along the top of each slide, each depression aligned horizontally with a corresponding depression in the slide located on an opposite side of the housing, the ends of the hanger rods sized to be receivably retained within the depressions.

4. The mist collector of claim 3 and further comprising:

means for holding the ends of the hanger rods in the depressions.

5. The mist collector of claim 4 wherein the holding means further comprises:

magnetic material located adjacent the depressions to magnetically hold the hanger rods within the depressions.

6. The mist collector of claim 1 wherein the housing includes a ledge adjacent to the open ends of the filter envelopes and said first means further comprises:

a pair of clamps, each clamp located on a side of the housing adjacent the ledge, each clamp including, a horizontal support rod rotatably secured to the ledge, a clamp member rigidly secured to the support rod, a handle extending from a first end of the support rod, adjacent the doorway, the handle oriented at an angle with respect to the support rod, and a retainer mounted to the ledge adjacent the doorway of the housing, whereby movement of the handle through a vertical plane rotates the support rod about a horizontal axis to rotate the clamp into and out of engagement with the filter assembly.

7. The mist collector of claim 1 wherein the housing further includes a fixed partition defining a boundary between upstream unfiltered and downstream filtered sections of the housing, said first means connecting the first open ends of the filter assembly in sealed engagement with the partition so that the filter envelopes span the flow path thereat.

8. The mist collection of claim 1 wherein the multipocket filter assembly serves as a second stage filter and further comprising:

a first stage filter located below the second stage filter, the door spanning the first and second filter stages.

* * * * *

UNITED STATES PATENT AND TRADEMARK OFFICE
CERTIFICATE OF CORRECTION

PATENT NO. : 5,277,704
DATED : January 11, 1994
INVENTOR(S) : David W. Miller et al.

It is certified that error appears in the above-identified patent and that said Letters Patent is hereby corrected as shown below:

At column 5, line 11, after "filter bag assemblies" insert -- 33 -- and delete [3].

At column 5, lines 40-41, after "Additionally or alternatively each," insert -- slide 47 may -- and delete [magnetic material].

At column 6, line 28, after "bottom frame" insert -- 30 -- and delete [3].

Signed and Sealed this

Twenty-sixth Day of July, 1994

Attest:

BRUCE LEHMAN

*Attesting Officer*    Commissioner of Patents and Trademarks